US008890716B2

(12) United States Patent
Takano et al.

(10) Patent No.: US 8,890,716 B2
(45) Date of Patent: Nov. 18, 2014

(54) PARKING ASSIST APPARATUS AND METHOD

(75) Inventors: Teruhisa Takano, Kawasaki (JP); Daisuke Tanaka, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/703,209

(22) PCT Filed: May 27, 2011

(86) PCT No.: PCT/JP2011/062234
§ 371 (c)(1),
(2), (4) Date: Dec. 10, 2012

(87) PCT Pub. No.: WO2011/155349
PCT Pub. Date: Dec. 15, 2011

(65) Prior Publication Data
US 2013/0096816 A1    Apr. 18, 2013

(30) Foreign Application Priority Data

Jun. 11, 2010   (JP) .................................. 2010-134040

(51) Int. Cl.
*B60Q 1/48*       (2006.01)
*B60W 30/06*     (2006.01)
*G08G 1/14*       (2006.01)
*B62D 15/02*      (2006.01)
*G06F 17/00*      (2006.01)

(52) U.S. Cl.
CPC ............ *G06F 17/00* (2013.01); *B62D 15/0275* (2013.01); *B62D 15/0265* (2013.01); *B62D 15/0285* (2013.01)
USPC ........... 340/932.2; 340/435; 340/436; 701/41

(58) Field of Classification Search
CPC ............... B62D 15/027–15/0285; B60R 1/00; B60R 2300/806; B60T 2201/10; B60W 30/06

USPC ......... 340/932.2, 435, 436; 348/118, E7.086; 701/400, 41
See application file for complete search history.

(56) References Cited

U.S. PATENT DOCUMENTS 6,061,002 A *  5/2000  Weber et al. ................ 340/932.2
6,825,880 B2 * 11/2004  Asahi et al. ............... 348/333.02

(Continued)

FOREIGN PATENT DOCUMENTS

CN          101128343 A      2/2008
DE     10 2007 009745 A1     9/2008

(Continued)

OTHER PUBLICATIONS

Russian Decision on Grant and English language translation dated Mar. 4, 2014 (16 pgs.).

(Continued)

*Primary Examiner* — Fadey Jabr
*Assistant Examiner* — Courtney Heinle
(74) *Attorney, Agent, or Firm* — Foley & Lardner LLP

(57) ABSTRACT

In order to provide parking assist even in a situation where an end portion of a vehicle is predicted to come into contact with an obstacle, an available parking space is set, and a target parking position is set within the available parking space. When it is determined that the end portion of the vehicle will come into contact with an end portion of the available parking space if the vehicle travels to be parked in the target parking position, an entering angle of the vehicle with respect to the available parking space is changed so that the vehicle may travel toward a target parking space with the end portion of the vehicle spaced away from a front end point P of the available parking space, and a parking path for the vehicle to travel to a non-final target parking position is calculated.

10 Claims, 13 Drawing Sheets

(56) References Cited

U.S. PATENT DOCUMENTS

| | | | |
|---|---|---|---|
| 6,999,002 B2 * | 2/2006 | Mizusawa et al. | 340/932.2 |
| 7,257,486 B2 * | 8/2007 | Shimazaki et al. | 701/300 |
| 8,244,457 B2 | 8/2012 | Milark et al. | |
| 8,645,015 B2 * | 2/2014 | Oetiker et al. | 701/25 |
| 2006/0274147 A1 * | 12/2006 | Chinomi et al. | 348/118 |
| 2008/0077294 A1 * | 3/2008 | Danz et al. | 701/41 |
| 2008/0100472 A1 * | 5/2008 | Mizusawa et al. | 340/932.2 |
| 2010/0019934 A1 * | 1/2010 | Takano | 340/932.2 |
| 2010/0039292 A1 * | 2/2010 | Scherl et al. | 340/932.2 |
| 2010/0079307 A1 * | 4/2010 | Tanaka et al. | 340/932.2 |
| 2010/0274446 A1 | 10/2010 | Sasajima et al. | |
| 2010/0274474 A1 * | 10/2010 | Takano | 701/200 |
| 2011/0082613 A1 | 4/2011 | Oetiker et al. | |
| 2011/0095910 A1 * | 4/2011 | Takano | 340/932.2 |
| 2011/0102196 A1 * | 5/2011 | Kadowaki et al. | 340/932.2 |
| 2011/0181441 A1 * | 7/2011 | Ma et al. | 340/932.2 |
| 2011/0298639 A1 * | 12/2011 | Kadowaki et al. | 340/932.2 |

FOREIGN PATENT DOCUMENTS

| | | | | |
|---|---|---|---|---|
| EP | 2 060 465 A1 | | 5/2009 | |
| JP | 2003-048500 | * | 2/2003 | B60R 21/00 |
| JP | 2003-48500 A | | 2/2003 | |
| JP | 2003-237511 A | | 8/2003 | |
| JP | 2003-291759 A | | 10/2003 | |
| JP | 2004-252837 | * | 9/2004 | G08G 1/16 |
| JP | 2004-252837 A | | 9/2004 | |
| JP | 2007-230371 | * | 9/2007 | B60R 21/00 |
| JP | 2009-061975 A | | 3/2009 | |
| JP | 2009-083806 | * | 4/2009 | B60R 21/00 |
| JP | 2009-83806 A | | 4/2009 | |
| JP | 2009-143410 | * | 7/2009 | B60R 1/00 |
| JP | 2009-154654 | * | 7/2009 | B60R 21/00 |
| JP | 2009-298178 | * | 12/2009 | B60R 21/00 |
| JP | 2009-298179 | * | 12/2009 | B60R 21/00 |
| JP | 2009-298179 A | | 12/2009 | |
| JP | 2010-028432 | * | 2/2010 | H04N 7/18 |
| JP | 2010-034645 | * | 2/2010 | H04N 7/18 |
| JP | 2010-100086 | * | 5/2010 | B60R 21/00 |
| RU | 2 380 725 C2 | | 1/2010 | |
| WO | WO 2009/078356 A1 | | 6/2009 | |

OTHER PUBLICATIONS

Supplementary European Search Report dated Mar. 13, 2014 (5 pgs.).

Chinese Office Action dated Jul. 30, 2014, 5 pgs.

* cited by examiner

PARKING ASSIST APPARATUS AND METHOD

TECHNICAL FIELD

The present invention relates to a parking assist apparatus and method for presenting information for parking a vehicle to a driver.

BACKGROUND ART

An apparatus described in Patent Literature 1 given below is known as a parking assist apparatus configured to present information for parking a vehicle to a driver.

Patent Literature 1 states that, in performing the parking assist, the parking assist apparatus displays a predicted path of an end of a vehicle on a bird's-eye image including the vehicle. The parking assist apparatus thus allows the driver to easily check a possibility that the vehicle may come into contact with an obstacle while moving backward because of the difference in turning radius between the outer wheels.

CITATION LIST

Patent Literature

PATENT LITERATURE 1: Japanese Patent Application Publication No. 2004-252837

SUMMARY OF INVENTION

Technical Problem

The parking assist apparatus described above, however, merely displays the predicted path of the vehicle end, and has a problem of being incapable of performing any parking assist when the predicted path of the vehicle end is in contact with the obstacle.

The present invention has been made in consideration of the circumstance described above, and has an objective of performing parking assist even in a situation where the vehicle end is predicted to come into contact with an obstacle.

Solution to Problem

The present invention sets a final target parking position within an available parking space, and determines whether or not there exists a first path for a vehicle to reach the final target parking position without coming into contact with an end portion of the available parking space. When a determination is made that the first path exists, the first path is displayed.

On the other hand, when a determination is made that the first path does not exist, the present invention calculates: an entering angle enabling the vehicle to enter the available parking space without coming into contact with the end portion of the available parking space; and a non-final target parking position which is a position to be reached when the vehicle enters the available parking space by using the entering angle. Then, the present invention calculates a second path for the vehicle to reach the non-final target parking position and a third path for the vehicle to reach the final target parking position from the non-final target parking position, and displays the second path and the third path.

Effects of Invention

According to the present invention, since the entering angle of the vehicle with respect to the available parking space and the non-final target parking position are set in a case where it is determined that an end portion of the vehicle will come into contact with an end portion of the available parking space when the vehicle travels to be parked in the final target parking position. Accordingly, parking assist can be provided even in a situation where the end portion of the vehicle is predicted to come into contact with an obstacle.

BRIEF DESCRIPTION OF DRAWINGS

FIG. 13(a) shows a state where the vehicle is moved forward by turning from a parallel-parking completion position, FIG. 13(b) shows a state where the vehicle backs up by turning from a position P5, and FIG. 13(c) shows a state where the vehicle is moved forward by turning from a position P6.

FIG. 14(a) shows a state where the vehicle is moved forward by turning from the parallel-parking completion position, and FIG. 14(b) shows a state where the vehicle is backed up straight from the position P5.

FIG. 15(a) shows a state where the vehicle is moved forward by turning from the position P6, FIG. 15(b) shows a state where the vehicle is backed up straight from a position P7, and FIG. 15(c) shows a state where the vehicle is moved forward by turning from a position P8.

DESCRIPTION OF EMBODIMENTS

An embodiment of the present invention is described below with reference to the drawings.

[Configuration of Parking Assist System]

Figure 1:
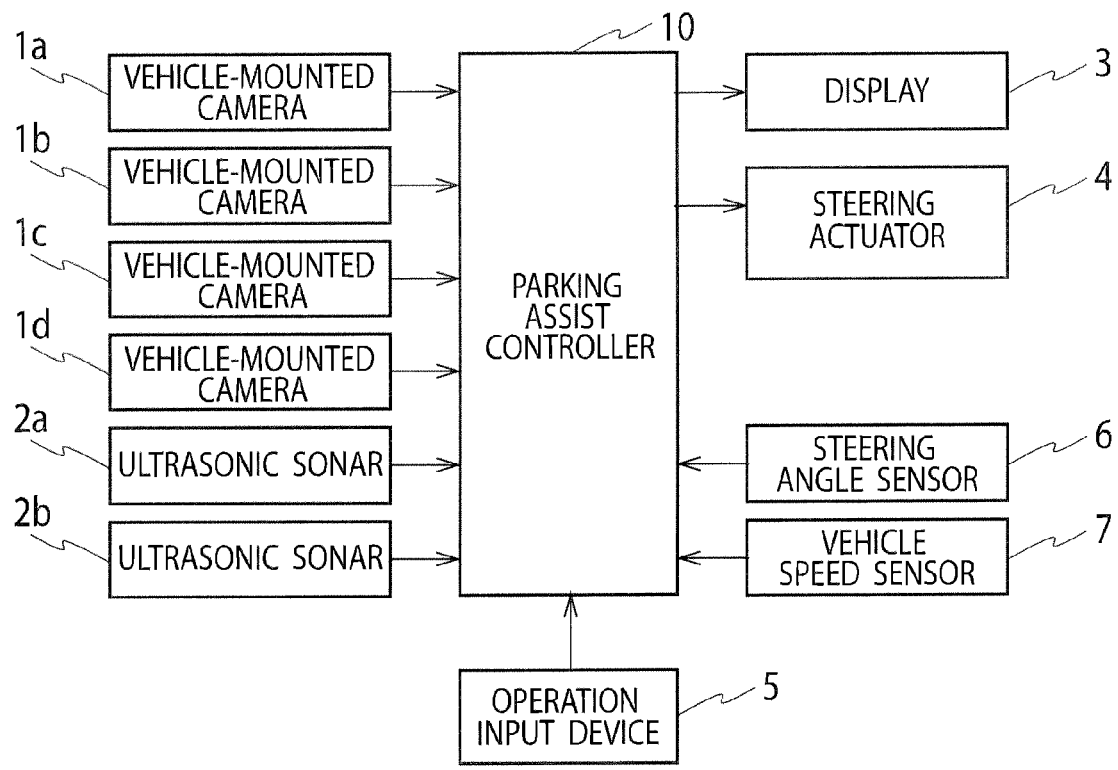
FIG. 1 is a block diagram showing the configuration of a parking assist system shown as an embodiment of the present invention.

FIG. 1 is a configuration diagram showing the configuration of a parking assist system to which the present invention is applied. This parking assist system is configured to calculate a path for guiding a vehicle to a target parking position, and to automatically control the steering of the vehicle so that the vehicle may move along the path.

The parking assist system is configured such that a parking assist controller 10 is connected to: four vehicle-mounted cameras 1a to 1d configured to shoot images of the vehicle's surroundings; paired left and right ultrasonic sonars 2a, 2b configured to measure the positions of objects on the left and right sides of the vehicle; a display 3 configured to display a bird's-eye image of the vehicle and its surroundings; a steering actuator 4 configured to drive the steering of the vehicle; an operation input device 5 configured to receive an operation input from the driver; a steering angle sensor 6 configured to detect the steering angle of the vehicle; and a vehicle speed sensor 7 configured to detect the vehicle speed of the vehicle.

Note that although the display by the display 3 and the steering driving by the steering actuator 4 are used as an example of presenting parking assist information about things such as a path and a parking position of a vehicle V in the present embodiment, the presentation method is not limited to them. Driving assist information may be presented by audio.

The vehicle-mounted cameras 1a to 1d are each formed of a CCD (Charge Coupled Device) camera or a CMOS (Complementary Metal-Oxide Semiconductor) camera having a wide imaging angle of about 180°, for example. These four vehicle-mounted cameras 1a to 1d are mounted on the vehicle V at appropriate locations so as to be able to shoot images of all areas surrounding the vehicle.

Figure 2:
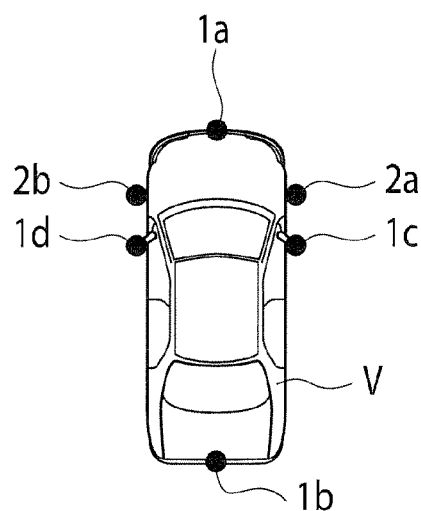
FIG. 2 is a top view showing the positions of vehicle-mounted cameras and ultrasonic sonars, which are installed in a vehicle, in the parking assist system shown as the embodiment of the present invention.

Specifically, as shown in FIG. 2 for example, the vehicle-mounted camera 1a, the vehicle-mounted camera 1b, the vehicle-mounted camera 1c, and the vehicle-mounted camera 1d are attached to the front grille, the rear finisher, the right door mirror, and the left door mirror of the vehicle V, respectively. The vehicle-mounted cameras 1a to 1d each shoot an image of an area in its predetermined range surrounding the vehicle, in a direction facing obliquely downward toward the road surface.

The ultrasonic sonars 2a, 2b are each configured to transmit ultrasonic waves and receive reflected waves which return after being reflected off an object. The ultrasonic sonars 2a, 2b each converts the time from the transmission of the ultrasonic waves to the reception of them into a distance to thereby measure the distance to the object. As shown in FIG. 2, the ultrasonic sonars 2a, 2b are attached to the right side part and the left side part of the vehicle V, respectively. The ultrasonic sonars 2a, 2b are installed so that their detection direction may be substantially perpendicular to the travelling direction of the vehicle V.

These ultrasonic sonars 2a, 2b are each used as obstacle detection means for measuring the position of an obstacle such as another vehicle parked near the target parking position of the vehicle V. Note that any device may be used as the obstacle detection means as long as it is capable of measuring the position of an obstacle. For example, a different device, such as a laser radar or a milliwave radar, may be used instead of the ultrasonic sonars 2a, 2b, for example.

The display 3 is a display device, such as a liquid crystal display, installed inside the vehicle compartment. The display 3 displays bird's-eye images of the surroundings of the vehicle and various pieces of parking assist information generated by the parking assist controller 10.

The operation of the steering actuator 4 is controlled by the parking assist controller 10. In accordance with the control by the parking assist controller 10, the steering actuator 4 drives the steering of the vehicle V. For example, a steering drive motor of an electric power steering system configured to electrically assist steering operations by the driver of a vehicle is used as the steering actuator 4.

The operation input device 5 receives various operational inputs made by the driver of the vehicle V. The operation input device 5 is formed, for example, of a directional key or a touch panel. When the driver inputs an operation, the operation input device 5 inputs an operation signal according to the inputted operation into the parking assist controller 10.

The steering angle sensor 6 inputs information on the steering angle of the vehicle V into the parking assist controller 10 as needed.

The vehicle speed sensor 7 inputs information on the speed of the vehicle V into the parking assist controller 10 as needed.

The parking assist controller 10 is configured including a microcomputer that operates according to a predetermined processing program, for example. The parking assist controller 10 implements various functions for the parking assist by the processing program executed in the CPU of the microcomputer.

Specifically, the parking assist controller 10 receives images shot by the four vehicle-mounted cameras 1a to 1d, converts the viewpoints of these images to obtain images each seen from a virtual viewpoint above the vehicle in accordance with a predetermined coordinate transformation algorithm, and pieces the images together. The parking assist controller 10 thus generates a bird's-eye image in which the surroundings of the vehicle are looked down at from above the vehicle, and displays the generated bird's-eye image of the surroundings of the vehicle on the display 3.

Figure 3:
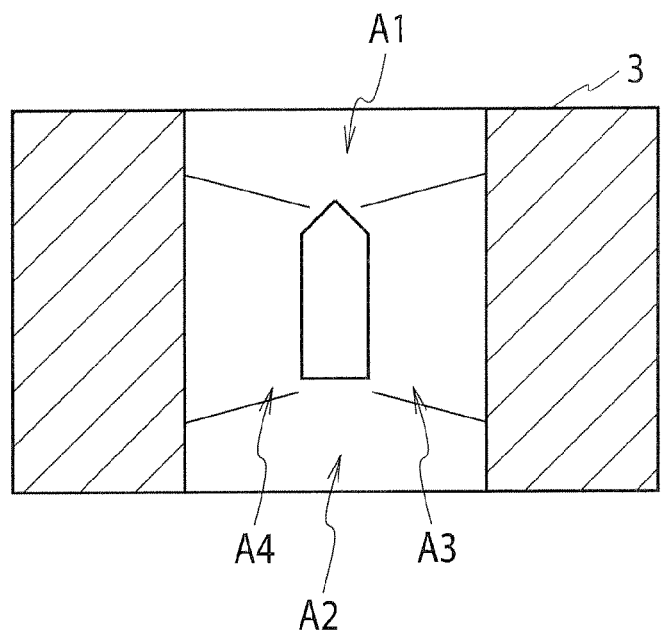
FIG. 3 is an image view showing an example of a bird's-eye image displayed on a display in the parking assist system shown as the embodiment of the present invention.

FIG. 3 shows an example of the bird's-eye image of the surroundings of the vehicle displayed on the display 3. In this image example, Region A1 represents an image obtained by converting the viewpoint of an image shot by the vehicle-mounted camera 1a attached to the front grille. Region A2 represents an image obtained by converting the viewpoint of an image shot by the vehicle-mounted camera 1b attached to the rear finisher. Region A3 represents an image obtained by converting the viewpoint of an image shot by the vehicle-mounted camera 1c attached to the right side camera door mirror. Region A4 represents an image obtained by converting the viewpoint of an image shot by the vehicle-mounted camera 1d attached to the left side camera door mirror.

Note that a vehicle position mark indicating the position of the vehicle is at the center of the bird's eye image, and is superimposed there as a computer graphics image. As shown by the image example of FIG. 3, the bird's-eye image displayed on the display 3 is an image with which the driver can check a situation of the 360° surroundings of the vehicle with the vehicle at the center, as if looking down from above the vehicle.

The parking assist controller 10 performs settings of an available parking space, a final target parking position, and the like for parking the vehicle V. Using information on obstacles, such as other vehicles, detected by the ultrasonic sonars 2a, 2b, the parking assist controller 10 sets an area having no obstacle as an available parking space, and sets a final target parking position within the available parking space. Alternatively, the parking assist controller 10 may recognize the positions of white lines or obstacles based on the images shot by the vehicle-mounted cameras 1a to 1d, set an area having no obstacle as the available parking space, and set the final target parking position within this available parking space.

Figure 4:
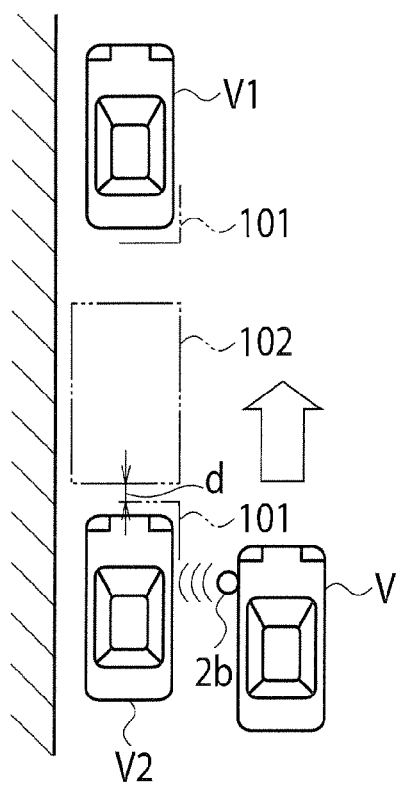
FIG. 4 is a top view showing a situation where an available parking space and a final target parking position are set in the parking assist system shown as the embodiment of the present invention.

Let us consider a case where as shown in FIG. 4, the vehicle V is moved straight and parallel-parked in an available parking space 101 on the left. When the vehicle V travels in parallel with other parallel-parked vehicles V1, V2, the ultrasonic sonar 2b can detect the front end of the other vehicle V2 and the rear end of the other vehicle V1. Thereby, the parking assist controller 10 identifies an available parking space between the front end of the other vehicle V2 and the rear end of the other vehicle V1. For example, as shown in FIG. 4, the available parking space 101 is recognized by the parking assist controller 10 as position information indicating a shape covering the rear corner part of the other vehicle V1 and position information indicating a shape covering the front corner part of the other vehicle V2.

After recognizing the available parking space 101, the parking assist controller 10 sets a final target parking position 102 within the available parking space 101. The parking assist controller 10 sets an area spaced away from the available parking space 101 by a certain distance d, as the final target parking position 102. For example, the parking assist controller 10 sets a position spaced away from the front corner part of the other vehicle V2 by the certain distance d, as the final target parking position 102. In addition, the parking assist controller 10 sets the final target parking position 102 so that the area thereof may correspond to the size of the vehicle V.

Figure 5:
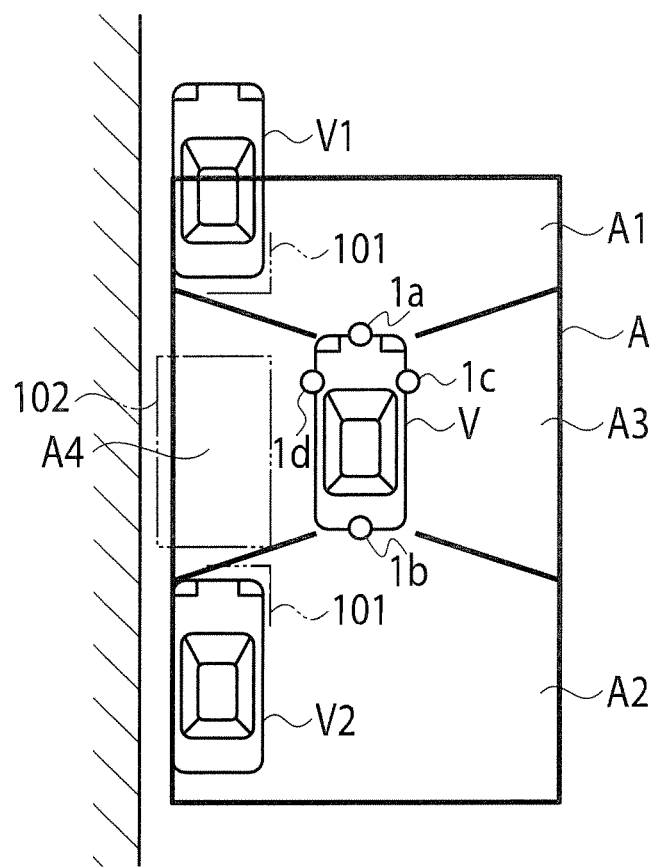
FIG. 5 is a top view illustrating ranges displayed on the display in the parking assist system shown as the embodiment of the present invention.

A description is given of the setting of the final target parking position 102 by the parking assist controller 10 in response to an operation by the driver. FIG. 5 is a schematic diagram showing a scene where the vehicle V is to be parallel-parked. Here, let us consider a case where the final target parking position 102 is set in the available parking space 101 vacant between the other vehicle V1 and the other vehicle V2, and the vehicle V is parked in this final target parking position 102 by backing up.

In this case, images shot by the four vehicle-mounted cameras 1a to 1d attached to the vehicle V are subjected to the viewpoint transformation and combined together. A bird's eye image is thus generated, and is displayed on the display 3. For example, when the driver of the vehicle V makes an operation input in order to specify, as the final target parking position 102, any position on the bird's-eye image displayed on the display 3 using the operation input device 5, the parking assist controller 10 may perform processing for setting the specified position as the target final parking position 102 of the vehicle V. In this case, the parking assist controller 10 movably displays a frame figure (the final target parking position 102) having a size corresponding to that of the vehicle V, on the bird's-eye image displayed on the display 3. Then, the driver of the vehicle V moves the final target parking position 102 to a desired position on the bird's-eye image using the operation input device 5. Thus, the target final parking position 102 can be set in any position intended by the driver. Operability improves when the final target parking position 102 of the vehicle V can be set by operations on the bird'-eye image in the above way.

The parking assist controller 10 calculates a path for parallel-parking the vehicle V in the final target parking position 102. Specifically, based on the positional relation between the set final target parking position 102 and the stopped position of the vehicle, the parking assist controller 10 calculates a path for the vehicle V to reach the final target parking position 102 while avoiding obstacles present in the front and the back of the available parking space 101.

Based on the path thus calculated, the parking assist controller 10 provides parking assist so that the vehicle V can be parallel-parked along the path. For example, by displaying the path for parallel parking on the display 3, the parking assist controller 10 can provide parking assist in which the path for parallel parking is presented to the driver. In addition, the parking assist controller 10 can perform the parking assist by providing audio guidance of the steering directions and angles. Further, the parking assist controller 10 can perform parking assist by controlling the steering actuator 4 so that the vehicle V can travel along the path.

For example, in automatically controlling the steering of the vehicle V so that the vehicle V may be moved along the path, the parking assist controller 10 calculates, as needed, a target steering angle for moving the vehicle V along the calculated path, while dead-reckoning the position and orientation of the vehicle V by monitoring the detection values given by the steering angle sensor 6 and the vehicle speed sensor 7 as needed. Then, the parking assist controller 10 automatically controls the steering of the vehicle V by controlling the operation of the steering actuator 4 so as to zero the deviation between the target steering angle and the actual steering angle detected by the steering angle sensor 6.

Figure 6:
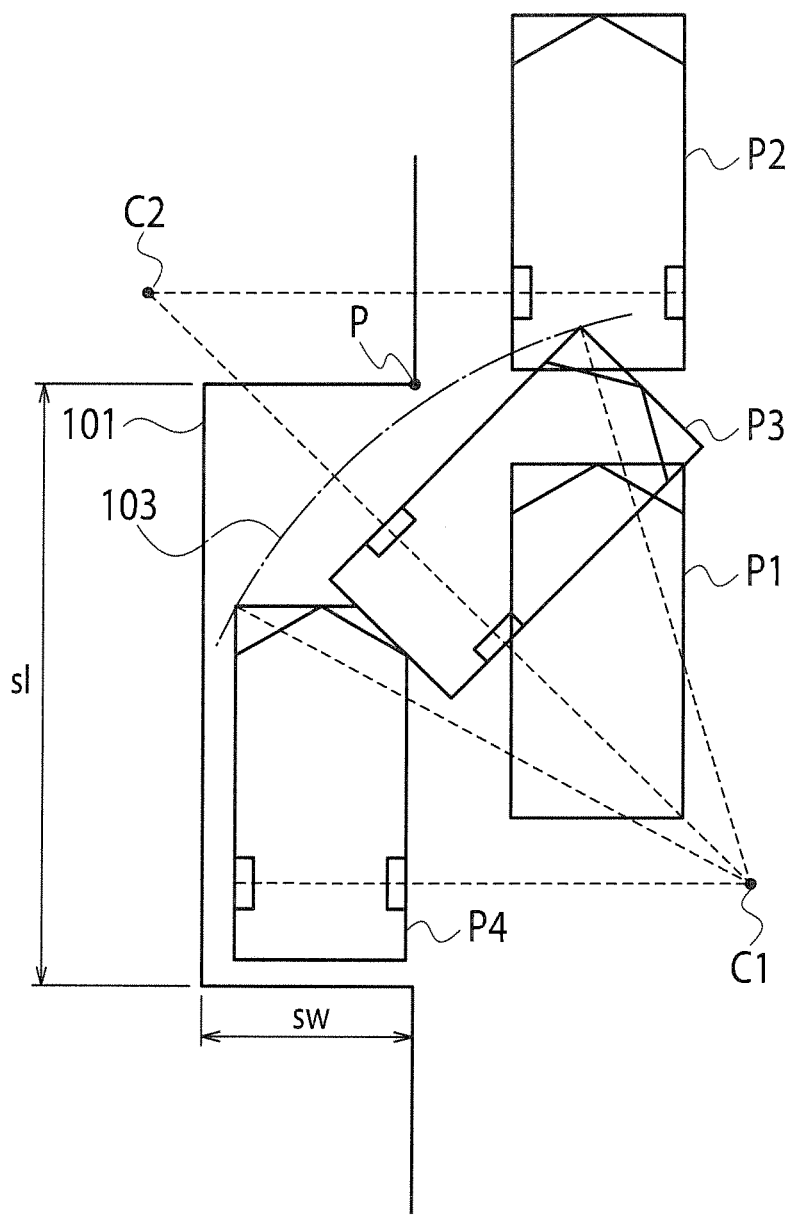
FIG. 6 is a top view showing a situation where the vehicle does not come into contact with a front end point of the available parking space in the parking assist system shown as the embodiment of the present invention.
Figure 7:
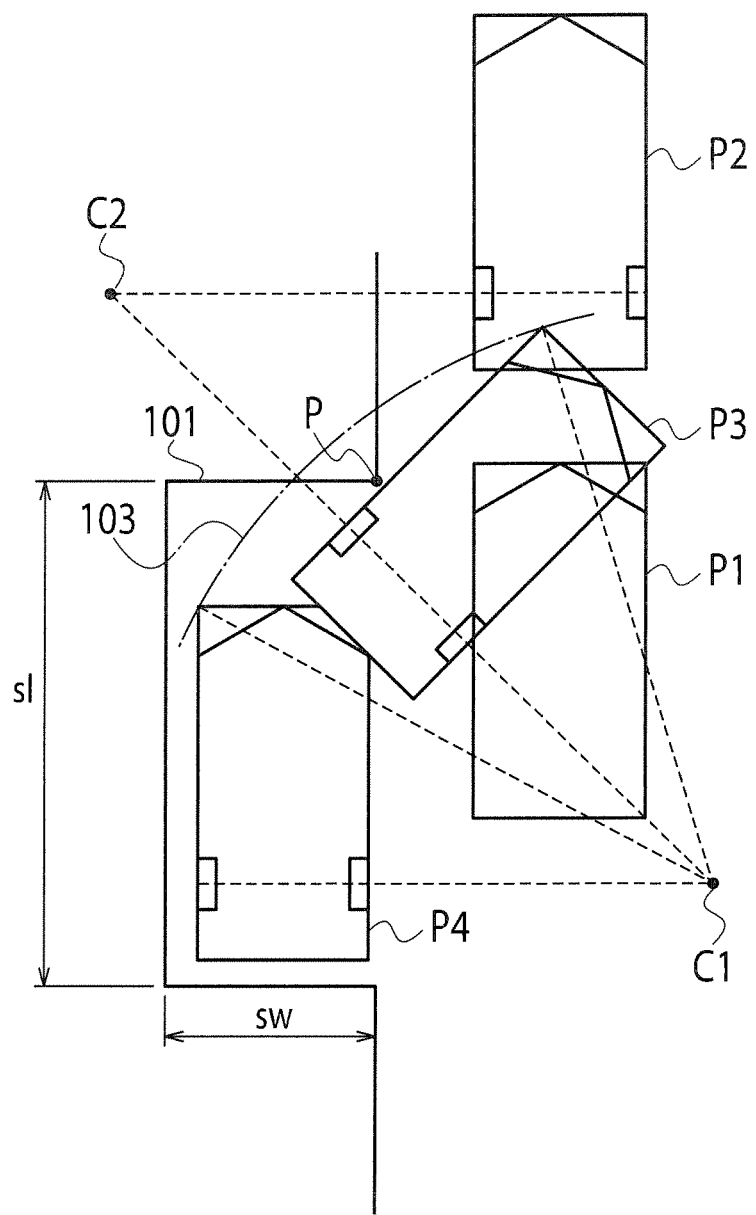
FIG. 7 is a top view showing a situation where the vehicle comes into contact with the front end point of the available parking space in the parking assist system shown as the embodiment of the present invention.

Next, the operations of the parking assist system of the present embodiment configured as above are described, considering a specific parking scene. FIGS. 6 and 7 are schematic diagrams showing a scene where the vehicle V is parallel-parked in the final target parking position 102.

As shown in FIG. 6, the vehicle V starts the parallel parking by being moved forward from an initial position P1 facing the available parking space 101. First, the vehicle V is moved forward to a back-up start position P2. After that, the vehicle V is backed up with the steering wheel fixed at a predetermined steering-wheel angle, turning about a back-up turn center C2 to reach a cut-back position P3. This predetermined steering-wheel angle is a steering-wheel angle which allows the vehicle V to be backed up from the back-up start position P2 so that the end portion of the vehicle V may reach a vehicle-end path 103 in FIG. 6.

Next, the vehicle V is turned about a back-up turn center C1 with the steering wheel being fixed at a predetermined steering-wheel angle which is made by turning the steering wheel in a direction opposite (i.e., cutting back the steering wheel) to the steering-wheel angle of backing the vehicle V up from the back-up start position P2 to the cut-back position P3. Thus, the vehicle V can reach a parallel-parking completion position P4 which matches the final target parking position 102. This predetermined steering-wheel angle indicates a certain steering-wheel angle, and in this example, allows the vehicle V to be backed up about the back-up turn center C1 so that the end portion of the vehicle V may be brought into contact with the vehicle-end path 103. By performing the parking assist in accordance with the running procedure in this way, the parking assist controller 10 can guide the vehicle V to the final target parking position 102 without wasting space.

The parking assist can be performed in the travelling procedures shown in FIG. 6 when a longitudinal length sl of the available parking space 101 is so large that the vehicle-end path 103 from the cut-back position P3 to the final target parking position 102 is not in contact with a front end point P of the available parking space 101, as shown in FIG. 6. As shown in FIGS. 4 and 5, the front end point P of the available parking space 101 is equal to the right-side rear end point of the other vehicle V1 parked in front of the final target parking position 102, among the positional information pieces indicating the available parking space 101. In FIG. 6, the vehicle-end path 103 is a track (first path) of the left front end portion of the vehicle V travelling backward from the cut-back position P3 to the final target parking position 102. In other words, the vehicle-end path 103 indicates a motion path (the first path) of a part of the vehicle V which comes closer to the front end point P than any other end portions of the vehicle V.

However, as shown in FIG. 7, when the longitudinal length sl of the available parking space 101 is small, the front end point P is closer to the back-up turn center C1 than the vehicle-end path 103 from the cut-back position P3 to the final target parking position 102 is. For this reason, if the vehicle V travels along the vehicle-end path 103, the left front end portion of the vehicle V comes into contact with the other vehicle V1 parked in front of the available parking space 101.

To avoid this, when the vehicle V is predicted to come into contact with the other vehicle V1, the parking assist system sets an entering angle with respect to the available parking space 101 and a non-final target parking position which is different from the final target parking position 102 so that the vehicle V may travel toward the final target parking position 102 with the end portion of the vehicle V spaced away from the end portion of the available parking space 101. Thus, the parking assist controller 10 calculates a path (second path) for the vehicle V to be parked at the non-final target parking position, without a contact between the end portion of the vehicle V and the front end point P of the available parking space 101. This non-final target parking position is set by modifying, or inclining, the final target parking position 102.

[Parking Assist Processing by Parking Assist System]

Figure 8:
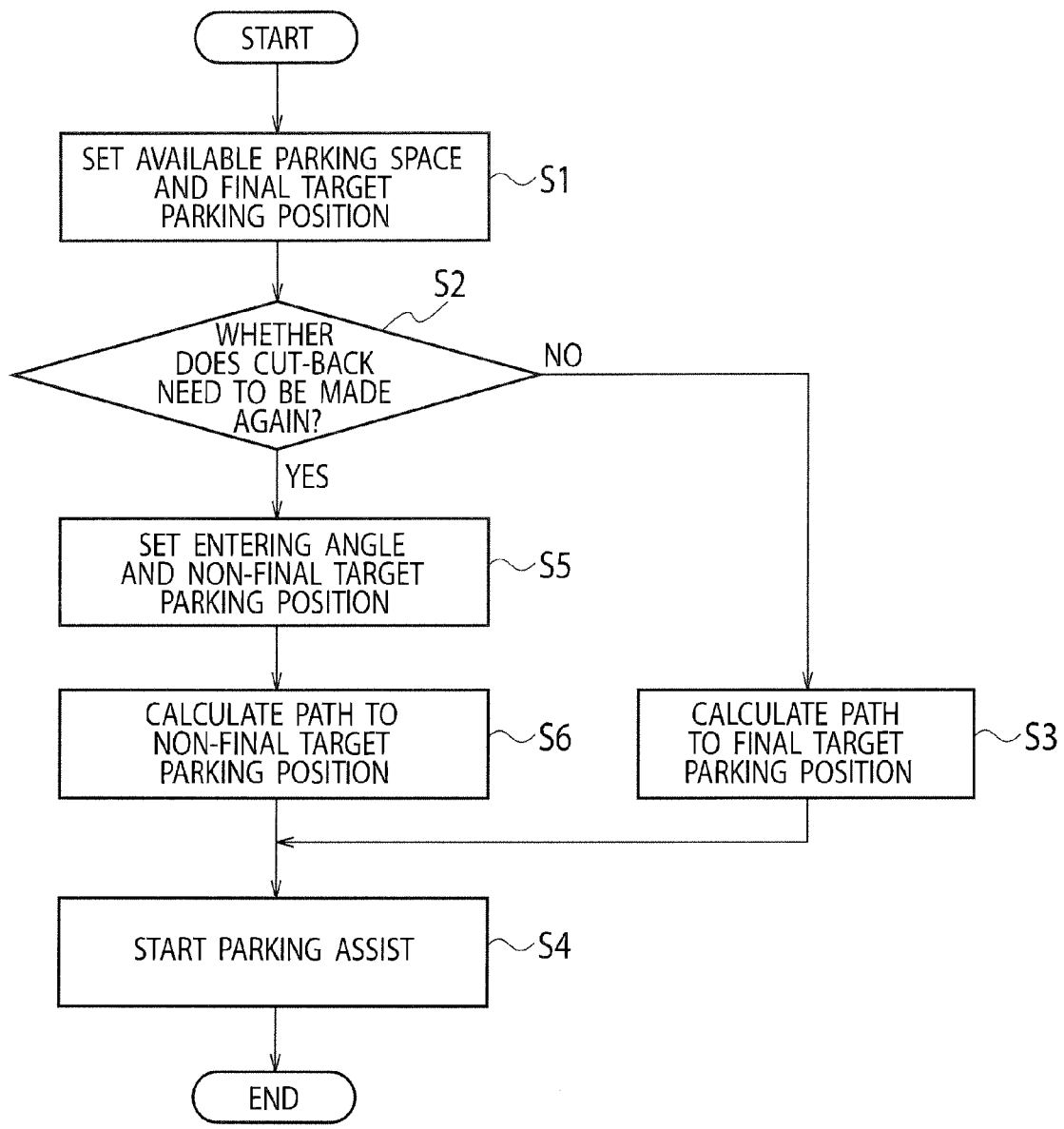
FIG. 8 is a flowchart showing processing procedures for parking assist, in which the parking assist system shown as the embodiment of the present invention calculates a path by setting an entering angle and a non-final target parking position.

The parking assist system to which the present invention as described above is applied performs parking assist processing in accordance with processing procedures shown in FIG. 8.

First, in Step S1, in the parking assist system, the parking assist controller 10 sets the available parking space 101 and the final target parking position 102.

Next, in Step S2, the parking assist controller 10 determines whether or not the end portion of the vehicle V will come into contact with the end portion of the available parking space 101 when the vehicle V travels to be parked in the final target parking position 102 set in Step 1.

In this process, the parking assist controller 10 determines whether or not the end portion of the vehicle V will come into contact with the front end point P of the available parking space 101 when the vehicle V is turned from the final target parking position 102 about the back-up turn center C1 as shown in FIGS. 6 and 7. In other words, the parking assist controller 10 determines whether or not there exists a first path for the vehicle V to reach the final target parking position 102 without coming into contact with the end portion of the available parking space 101. In this determination, based on the position of the final target parking position 102 and on the turning radius of the vehicle V, the parking assist controller 10 calculates the vehicle-end path 103 for the vehicle V to turn from the final target parking position 102 about the back-up turn center C1. The parking assist controller 10 determines that the end portion of the vehicle V will come into contact with the front end point P of the available parking space 101 when the front end point P of the available parking space 101 is closer to the back-up turn center C1 than the vehicle-end path 103 is.

When determining that the vehicle V will not come into contact with the front end point P of the available parking space 101, the parking assist controller 10 determines that cut-back does not need to be made again after reaching the final target parking position 102, and proceeds to Step S3. On the other hand, when determining that the vehicle V will come into contact with the front end point P of the available parking space 101, the parking assist controller 10 determines that cut-back needs to be made again after reaching the final target parking position 102, and proceeds to Step S5.

In parallel parking, the first cut-back is made when the vehicle V is started moving from the cut-back position P3 to the parallel-parking completion position P4. The re-cut-back in Step S2 is cut-back for guiding the vehicle V, which has been guided to a non-final target parking position set by changing the angle of the target parking position 102, to become parallel to the available parking space 101.

In Step S3, the parking assist controller 10 calculates a first path from the initial position P1 to the back-up start position P2, then from the back-up start position P2 to the cut-back position P3, and then from the cut-back position P3 to the parallel-parking completion position P4, as shown in FIG. 6. In this calculation, the parking assist controller 10 calculates the first path from the cut-back position P3 to the parallel-parking completion position P4 by obtaining the cut-back position P3 which is a position to which the vehicle V is turned from the parallel-parking completion position P4 about the back-up turn center C1. The parking assist controller 10 then calculates a path from the back-up start position P2 to the cut-back position P3 by obtaining the back-up start position P2 which is a position to which the vehicle V is turned from the cut-back position P3 about the back-up turn center C2. The parking assist controller 10 then calculates a path from the back-up start position P2 to the initial position P1 as a path from the initial position P1 to the back-up start position P2.

In Step 5, the parking assist controller 10 calculates an optimal angle of the final target parking position 102 with respect to the available parking space 101, which angle allows the vehicle V to travel toward the final target parking position 102 while being spaced away from the end portion of the available parking space 101. Next, in Step S6, the parking assist controller 10 calculates a second path to a non-final target parking position 102' set using the entering angle set in Step S5. The processing in each of Step 5 and Step 6 will be described later.

In Step S4, the parking assist controller 10 displays the first path calculated in Step S3 or the second path calculated in Step 6 on the display 3. In this display, it is desirable that the information displayed by the parking assist controller 10 should include information about things such as steering directions and steering-wheel angles for guiding the vehicle V to the calculated first path or second path. The parking assist controller 10 thus performs the parking assist for parallel parking.

[Processing for Changing Target Parking Position 102]

Next, a description is given of the processing for setting the entering angle and the non-final target parking position 102' in Step S5 and the processing for calculating the second path in Step S6.

Figure 9:
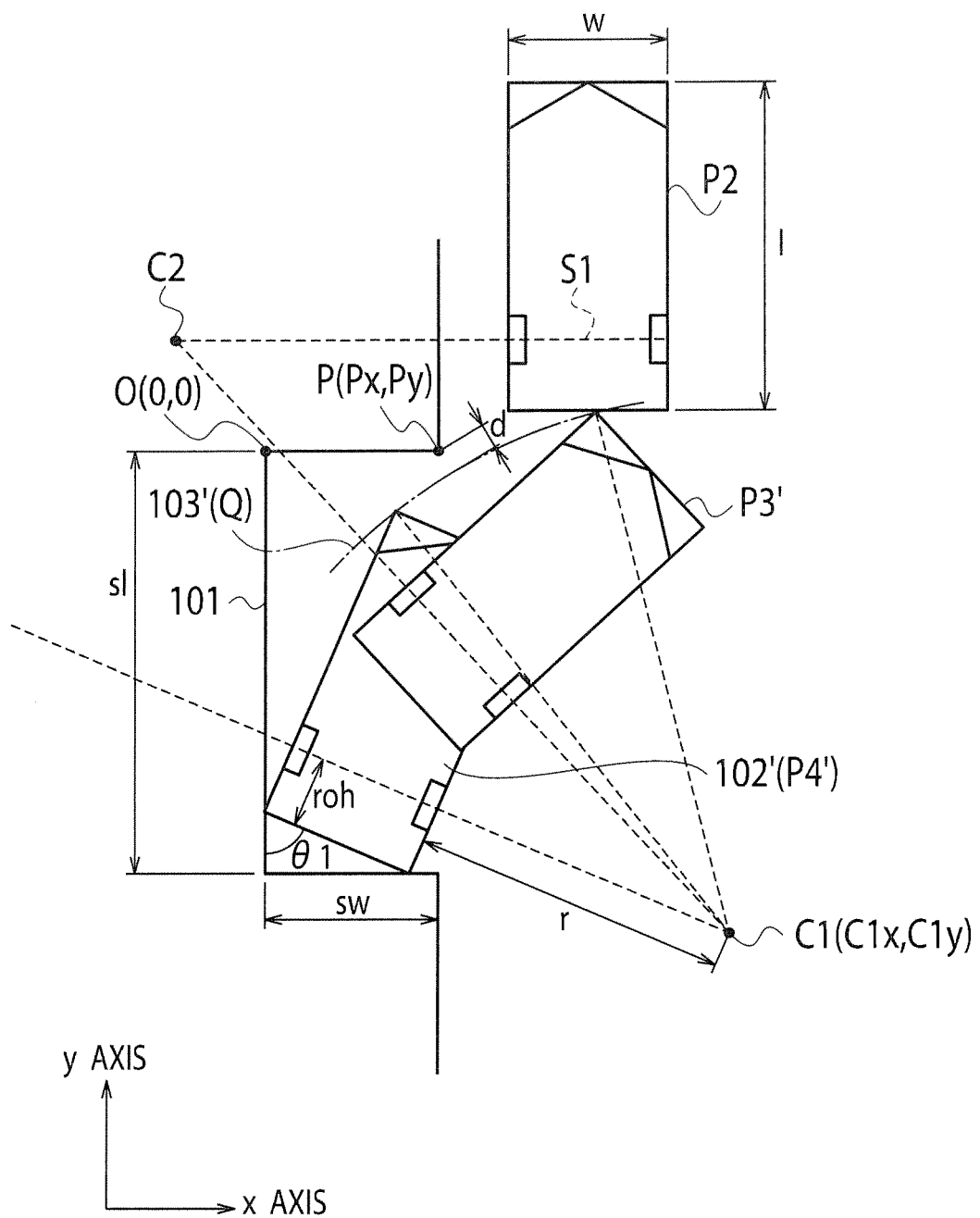
FIG. 9 is a top view illustrating processing for determining a non-final target parking position and an entering angle $\theta 1$ in the parking assist system shown as the embodiment of the present invention.

FIG. 9 is a schematic diagram showing first processing for setting an entering angle θ1 with respect to the available parking space 101 through processing for changing the target parking position 102.

The parking assist controller 10 changes the angle of the target parking position 102 with respect to the available parking space 101, and thus sets the entering angle θ1 with respect to the available parking space 101 so that the track of the end portion of the vehicle V travelling forward from the changed non-final target parking position 102' with a predetermined turn radius can keep a certain distance from the front end point P of the available parking space 101. Here, the end portion of the vehicle V is a corner portion, on the outer wheels side, of the vehicle V. Further, the front end point P of the available parking space 101 is an end portion of an obstacle present in front of the available parking space 101.

As shown in FIG. 9, the parking assist controller 10 sets the non-final target parking position 102' (a parallel-parking completion position P4') by inclining the target parking position 102 with respect to the available parking space 101 by the entering angle θ1.

Let us consider a second path in which the vehicle V backs up from the back-up start position P2 to the non-final target parking position 102' through a cut-back position P3'. When the longitudinal length sl of the available parking space 101 is small, the non-final target parking position 102' needs to be determined so that a vehicle-end path 103' to be followed by an outer-wheels-side corner portion Q of the vehicle V in the path from the cut-back position P3' to the non-final target parking position 102' keeps the predetermined distance d from the front end point P of the available parking space 101.

To this end, the entering angle θ1 satisfying Formula 1 below is obtained for the back-up turn center C1 of the vehicle V backing up from the cut-back position P3' with a predetermined steering-wheel angle. As shown in FIG. 9, this predetermined steering-wheel angle is a steering-wheel angle which allows the left front end portion of the vehicle V not to come into contact with the front end point P of the available parking space 101 when the vehicle V backs up from the cut-back position P3' along the vehicle-end path 103'.

$$C_1P - d = C_1Q \quad \text{(Formula 1)}$$

Here, let us consider a coordinate system whose x axis and y axis represent the horizontal direction and the vertical direction of FIG. 9, respectively, and whose origin of ordinates O represent the left corner portion of an obstacle in front of the available parking space 101.

$$Px = sw, Py = 0 \quad \text{(Formula 2)}$$

$$C_1x = (w+r) \times \sin θ1 + \text{roh} \times \cos θ1 \quad \text{(Formula 3)}$$

$$C_1y = sl - \text{roh} \times \sin θ1 + r \times \cos θ1 \quad \text{(Formula 4)},$$

where the longitudinal length of the available parking space 101 is sl, the width of the available parking space 101 is sw, the length of the vehicle V is l, the width of the vehicle V is w, a distance from the axle of the rear wheels of the vehicle V to an end of the body of the vehicle V (rear over-hang) is roh, the turn radius of the vehicle V backing up from the cut-back position P3' is r, the coordinate value of the front end point P is P(Px, Py), and the coordinate value of the back-up turn center C1 is C1($C_1$x, $C_1$y). By these Formulae 2, 3, and 4, equations below hold.

$$C_1Q^2 = (r+w)^2 + (l-\text{roh})^2 \quad \text{(Formula 5)}$$

$$C_1P^2 = \{(w+r) \times \sin θ1 + \text{roh} \times \cos θ1 - sw\}^2 + (sl - \text{roh} \times \sin θ1 + r \times \cos θ1)^2 \quad \text{(Formula 6)}$$

Therefore, by substituting Formulae 5 and 6 into Formula 1 to solve Formula 1 for the angle θ1, the entering angle θ1 with respect to the available parking space 101 can be obtained.

By the above first processing for changing the target parking position 102, the parking assist controller 10 can set the entering angle and the non-final target parking position 102' resulting from changing the angle of the target parking position 102 in accordance with the longitudinal length sl of the available parking space 101. Thereby, the parking assist system can perform the parking assist which prevents the outer-wheels-side corner portion Q of the vehicle V from coming into contact with the front end point P of the available parking space 101 even when the available parking space 101 is narrow. Moreover, even when it seems to the driver that the available parking space 101 is too narrow to parallel park, the parking assist system can guide the vehicle V to the target parking position 102' to enable the driver to parallel park.

Further, as shown in FIG. 9 described above, the parking assist system can not only perform the processing for changing the entering angle θ1 with respect to the available parking space 101, but also obtain an entering angle θ2 with respect to the available parking space by performing second processing for changing the target parking position 102, which will be described below.

In the second processing for changing the target parking position 102, the entering angle θ2 with respect to the available parking space 101 is set so that in the track of the end portion of the vehicle V travelling straight from the changed parallel-parking completion position P4', the track of the end portion of the vehicle V on the side facing the inside of the available parking space 101 may keep a certain distance from the end portion of the available parking space 101. Here, the end portion of the vehicle V is a corner portion of the vehicle V on the outer-wheels side (a left front end portion). Further, the front end point P of the available parking space 101 is an end portion of an obstacle present in front of the available parking space 101.

Figure 10:
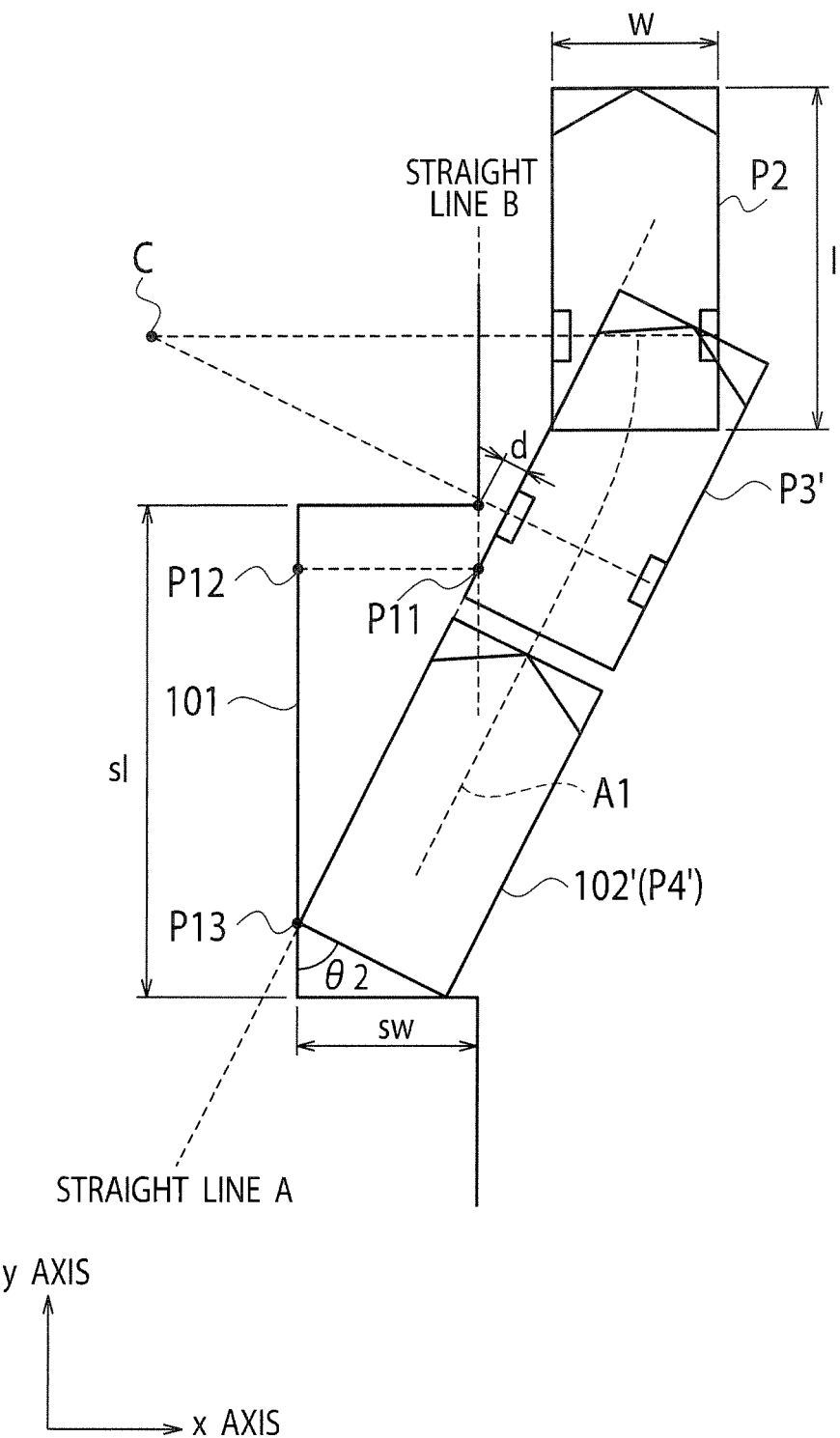
FIG. 10 is a top view illustrating processing for determining a non-final target parking position and an entering angle $\theta 2$ in the parking assist system shown as the embodiment of the present invention.

FIG. 10 is a schematic diagram showing processing for setting the entering angle θ2 with respect to the available parking space 101 through the second processing for changing the target parking position 102.

Here, let us consider a second path for the vehicle V to back up from the back-up start position P2, and reach the non-final target parking position 102' through the cut-back position P3'. When the longitudinal length sl of the available parking space 101 is small, the parking assist controller 10 sets the entering angle θ2 with respect to the available parking space 101 so that, among the tracks of the four end portions of the vehicle V travelling straight from the non-final target parking position 102', the track of the end portion of the vehicle V on the side facing the inside of the available parking space 101 (a straight line A) may keep a certain distance d from the front end point P of the available parking space 101.

Under the setting of such entering angle θ2 of the vehicle V, the operation of the vehicle V from the cut-back position P3' to the non-final target parking position 102' is to back the vehicle V up with the steering wheel in a substantially neutral position. Accordingly, the track from the cut-back position P3' to the non-final target parking position 102' is substantially straight.

As shown in FIG. 10, an intersection between an extended line of a straight line B forming the available parking space 101 and the straight line A is indicated by P11. In addition, an intersection between the available parking space 101 and a perpendicular to the available parking space 101 from the intersection P11 is indicated by P12, and an intersection between the straight line A and the available parking space 101 is indicated by P13. Further, when the longitudinal length sl of the available parking space 101, the width sw of the available parking space 101, and the length l of the vehicle V, and the width w of the vehicle V are used as described above, equations below hold.

$$\text{segment } P11P12 = sw \quad \text{(Formula 7)}$$

$$\text{segment } P12P13 = sl - d/\cos\theta2 - w\cos\theta2 \quad \text{(Formula 8)}$$

For ΔP11P12P13, an equation below holds.

$$\tan\theta2 = P12P13/P11P12 \quad \text{(Formula 9)}$$

By substituting Formulae 7 and 8 into Formula 9, an equation below is obtained.

$$\tan\theta2 = (sl - d/\cos\theta2 - w\cos\theta2)/sw \quad \text{(Formula 10)}$$

When this Formula 10 is solved for the angle θ2, the entering angle θ2 which is an angle formed by the non-final target parking position 102' and the available parking space 101 can be obtained.

By the above-described second processing for changing the target parking position 102, the parking assist controller 10 can set the entering angle and the non-final target parking position 102' resulting from changing, in accordance with the available parking space 101, the target parking position 102 to guide the vehicle V. Thereby, as shown with a track A1 in FIG. 10, the parking assist system enables the vehicle V to turn about the back-up turn center C from the back-up start position P2 to the cut-back position P3' and to move straight from the cut-back position P3' to the non-final target parking position 102'. Thereby, even when the available parking space 101 is narrow, the vehicle V can be provided with the parking assist which prevents the outer-wheels-side corner portion Q of the vehicle V from coming into contact with the front end point P of the available parking space 101. Further, even when it seems to the driver that the available parking space 101 is too narrow to parallel park, the vehicle V can be guided to the non-final target parking position 102' to enable the driver to parallel park.

Note that the parking assist controller 10 may calculate multiple second paths including: the path, shown in FIG. 9, for the vehicle to move to the non-final target parking position 102' by turning; and the path for the vehicle to move straight to the non-final target parking position 102'. Then, the parking assist controller 10 is also capable of displaying the multiple second paths.

A comparison is now made between the first processing for changing the target parking position 102 and the second processing for changing the target parking position 102. Compared to the second processing for changing the target parking position 102, the first processing for changing the target parking position 102 can reduce the number of cut-backs for making the orientation of the vehicle V parallel to the available parking space 101 after the vehicle is stopped, inclined with respect to the available parking space 101 by the entering angle θ1.

The reason for this is as follows. As shown in FIG. 9, the vehicle V is moved from the cut-back position P3' to the parallel-parking completion position P4' by turning. Consequently, the entering angle θ1 obtained by the first processing for changing the target parking position 102 can be made smaller than the entering angle θ2 obtained by the second processing for changing the target parking position 102.

However, the first processing for changing the target parking position 102 makes the vehicle V turn while moving from the cut-back position P3' to the parallel-parking completion position P4'. For this reason, the corner portion (the front point P) of the vehicle in front approaches the outer-wheels-side corner portion Q of the vehicle V. Accordingly, the parking assist by the first processing for changing the target parking position 102 is more likely to give the driver a feeling of uneasiness than that by the second processing for changing the target parking position 102.

In contrast, the second processing for changing the target parking position 102 makes the vehicle V back up substantially straight while moving from the cut-back position P3' to the parallel-parking completion position P4'. Thus, the distance between the corner portion (the front end point P) of the vehicle V in front and the outer-wheels-side corner portion Q of the vehicle remains unchanged, not giving a feeling of uneasiness to the driver.

However, the entering angle θ2 obtained by the second processing for changing the target parking position 102 is larger than the entering angle θ1 obtained by the first processing for changing the target parking position 102. This results in the more number of cut-backs for making the orientation of the vehicle V parallel to the available parking space 101 after being stopped at the parallel-parking completion position P4'.

[Processing for Calculating Path to Changed Target Parking Position 102']

Next, a description is given of processing for calculating a path for the vehicle V to move from the initial position P1 to the parallel-parking completion position P4', after the entering angle and the non-final target parking position 102' are set as described above.

Figure 11:
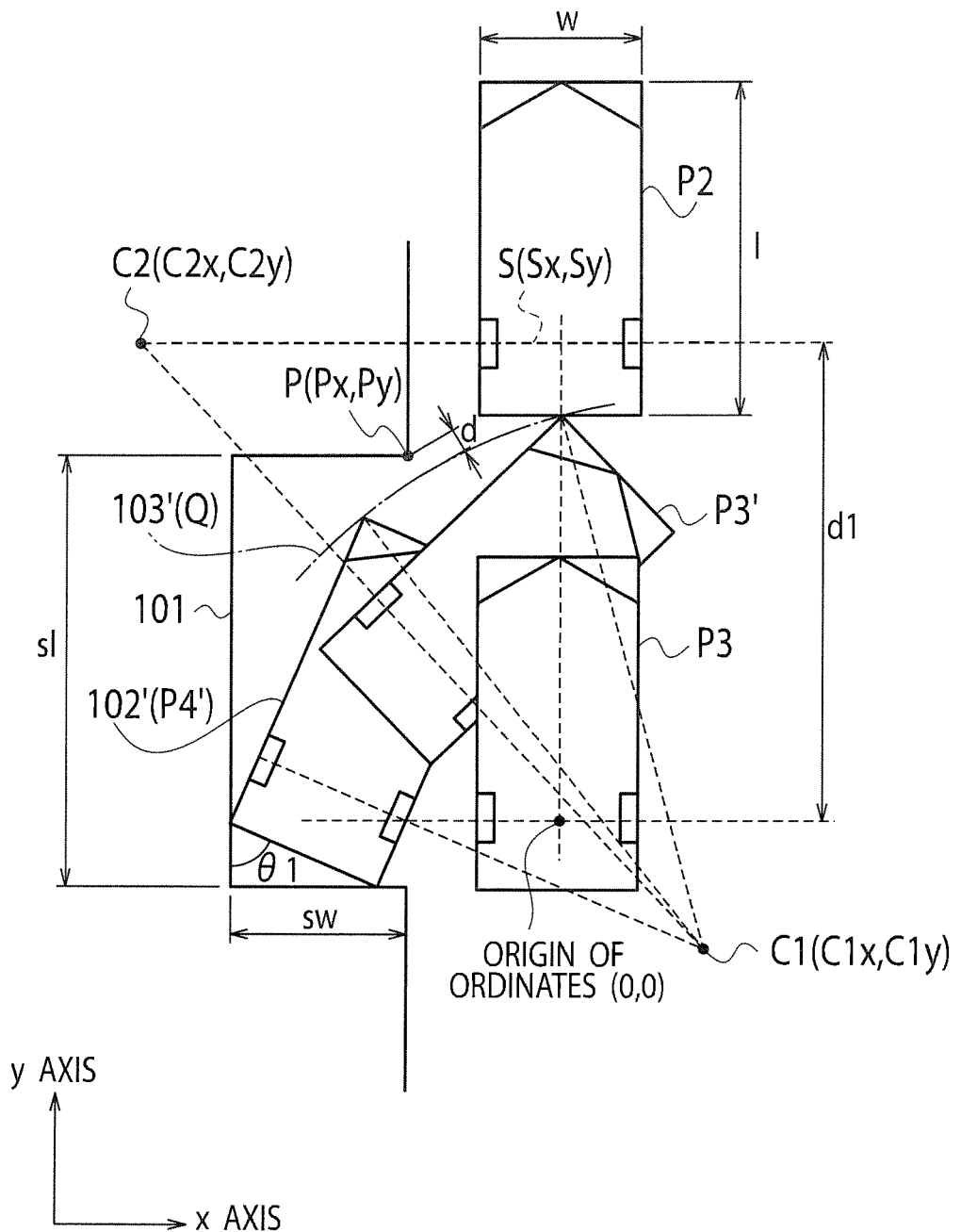
FIG. 11 is a top view illustrating processing for determining a distance to a back-up start position in the parking assist system shown as the embodiment of the present invention.

FIG. 11 is a schematic diagram illustrating first path-calculation processing. The first path-calculation processing is performed after the first processing for changing the target parking position 102.

In parallel parking, the vehicle V is moved forward from the initial position P1 to the back-up start position P2 with the steering wheel in neutral. Thereafter, the steering wheel is turned to the left, and the vehicle V is backed up to the cut-back position P3' with the steering-wheel angle of the steering wheel being fixed. At this steering-wheel angle, the vehicle V is allowed to back up until the end portion of the vehicle V comes in contact with the vehicle-end path 103'. Moreover, the steering wheel is turned to the right at the cut-back position P3', and the vehicle V is backed up to the parallel-parking completion position P4' with the steering-wheel angle of the steering wheel being fixed. This steering-wheel angle allows the vehicle V to back up while the end portion of the vehicle V follows the vehicle-end path 103'.

To guide the vehicle V in such a way, the parking assist controller 10 obtains a distance d1 from the initial position P1 to the back-up start position P2.

First, an x axis and a y axis are set for the coordinate system. The origin of ordinates O(0,0) is set to the center of the axle of the rear wheels at the initial position P1, the center of the axle of the rear wheels at the back-up start position P2 is set to S(Sx,Sy), and the back-up turn center of the vehicle V backing up from the back-up start position P2 with a predetermined steering-wheel angle is set to C2($C_2$x,$C_2$y). Then, equations below hold.

$$Sx=0 \quad \text{(Formula 11)}$$

$$Sy=d1 \quad \text{(Formula 12)}$$

$$C2x=-w/2-r \quad \text{(Formula 13)}$$

$$C2y=d1 \quad \text{(Formula 14)}$$

In FIG. 11, since the coordinate of the back-up turn center C1 has already been obtained as described with reference to FIG. 9 above, and since the distance between the back-up turn center C1 and the back-up turn center C2 is 2×r+w, an equation below holds.

$$(C1x-C2x)^2+(C1y-C2y)^2=(2\times r+w)^2 \quad \text{(Formula 15)}$$

The distance d1 from the initial position P1 to the back-up start position P2 can be obtained by substituting Formulae 13 and 14 into Formula 15. Note that, since the coordinate of the origin of ordinates shown in FIG. 9 is changed as shown in FIG. 11, Formulae 3 and 4 described above cannot be used as they are, and need to be converted into those in the coordinate system of the origin of ordinates O shown in FIG. 11 to obtain the back-up turn center C1.

As for a case of starting the parking assist at the back-up start position P2, the cut-back position P3' for turning the steering wheel in the opposite direction in the course of the path to the non-final target parking position 102' can be obtained similarly. In other words, the back-up turn center C2 of the vehicle V backing up from the back-up start position P2 with a predetermined steering-wheel angle is set as shown in Formulae 13 and 14, and the cut-back position P3' is set to the position at which the corner portion of the vehicle V comes into contact with the vehicle-end path 103' when the vehicle V backs up at a predetermined steering-wheel angle for backing up from the back-up start position P2 about the back-up turn center C2.

Figure 12:
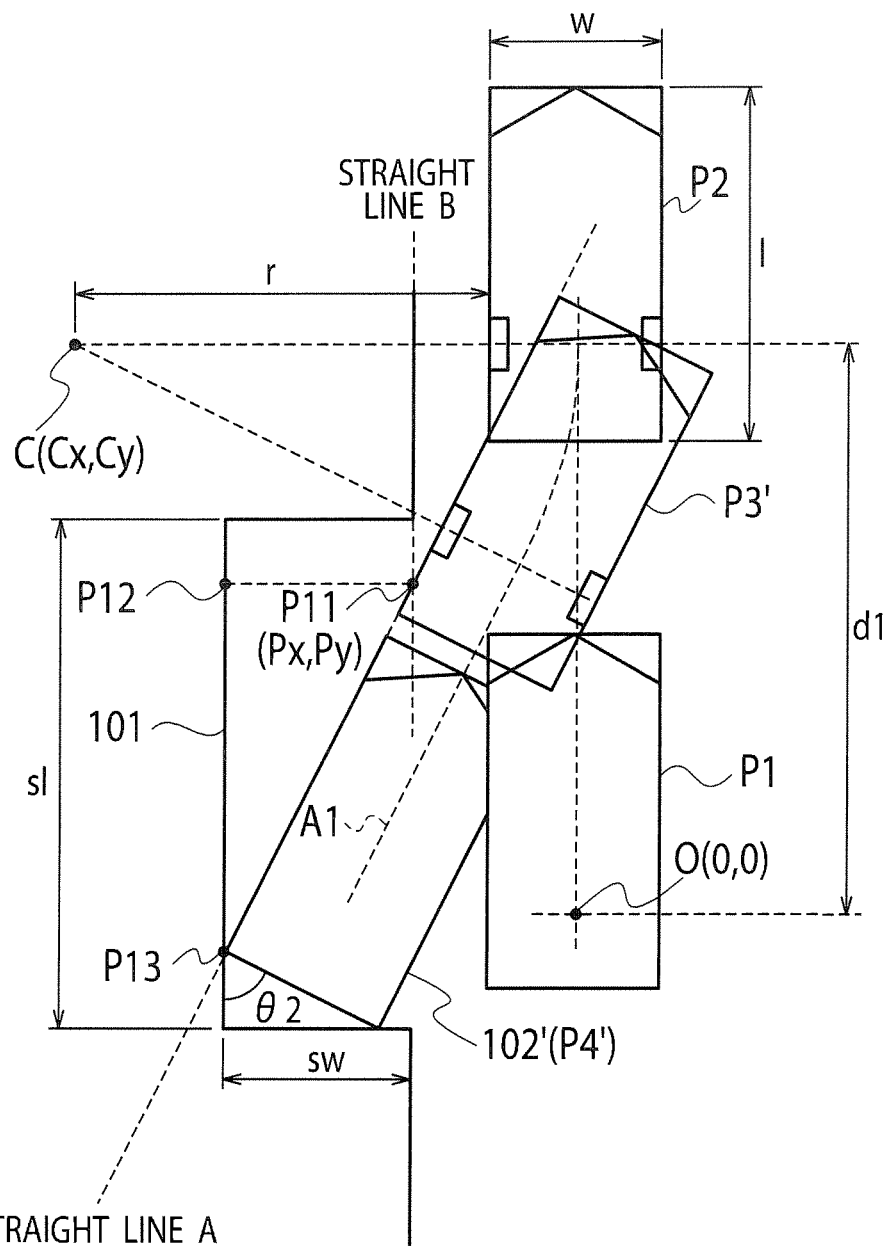
FIG. 12 is the other top view illustrating processing for determining a distance to a back-up start position in the parking assist system shown as the embodiment of the present invention.

FIG. 12 is a schematic diagram illustrating second path-calculation processing. The second path-calculation processing is performed after the second processing for changing the target parking position 102.

The parking assist controller 10 obtains a distance d1 from the initial position P1 to the back-up start position P2. As shown in FIG. 12, an x axis and a y axis are set for a coordinate system, and the origin of ordinates O(0,0) is set to the center of the axle of the rear wheels at the initial position P1. The parking assist controller 10 sets the turn center of the vehicle V backing up from the cut-back position P3' with any steering-wheel angle to C(Cx,Cy). The distance d1 between the initial position P1 and the back-up start position P2 is obtained using the condition that r is the distance between the straight line A and the turn center C of the vehicle V backing up from the back-up start position P2. First, since the inclination of the straight line A to the longitudinal direction of the available parking space 101 is tan θ2 and the straight line A intersects the straight line B at the intersection P11(Px,Py), the equation expressing the straight line A satisfies:

$$y-Py=\tan\theta2\times(x-Px) \quad \text{(Formula 16)}$$

$$\tan\theta2\times x-y+(Py-Px\times\tan\theta2) \quad \text{(Formula 17)}$$

Since the distance between the turn center C and the straight line A is r, an equation below holds.

$$|\tan\theta2\times Cx-Cy+(Py-Px\times\tan\theta2)|/[(\tan\theta2)^2+1]^{1/2}=r \quad \text{(Formula 18)}$$

Here, equations below hold.

$$Cx=-(r+W/2) \quad \text{(Formula 19)}$$

$$Cy=-d1 \quad \text{(Formula 20)}$$

Therefore, the distance d1 between the initial position P1 and the back-up start position P2 can be obtained by substituting Formulae 19 and 20 into Formula 18.

As for a case of starting the parking assist at the back-up start position P2, the cut-back position P3' for turning the steering wheel in the opposite direction in the course of the path to the non-final target parking position 102' can be obtained similarly. In other words, the back-up turn center C of the vehicle V backing up from the back-up start position P2 at a predetermined steering-wheel angle is set as in Formulae 19 and 20, and the cut-back position P3' is set to the position at which the vehicle V lines up longitudinally with the straight line A after backing up at a predetermined steering-wheel angle for backing up from the back-up start position P2 about the back-up turn center C.

After the determination of a path through the first path-calculation processing or the second path-calculation processing, the parking assist controller 10 firstly makes a display to guide the vehicle V to move forward from the initial position P1 to the back-up start position P2 with the steering wheel in neutral and does the like. The parking assist controller 10 recognizes that the vehicle V has reached the back-up start position P2 by recognizing that the vehicle V has traveled by the distance d1, based on the steering-wheel angle detected by the steering angle sensor 6 and the vehicle speed detected by the vehicle speed sensor 7.

After that, the parking assist controller 10 recalculates a path from the back-up start position P2 to the non-final target parking position 102' through the cut-back position P3', makes a display to guide the vehicle V to move along the path to the cut-back position P3' and does the like. For example, the parking assist controller 10 displays the turn angle of the steering wheel so as to align the actual steering-wheel angle to a target steering-wheel angle calculated at the back-up start position P2.

The parking assist controller 10 recognizes that the vehicle V has reached the cut-back position P3' based on the steering-wheel angle detected by the steering angle sensor 6 and the vehicle speed detected by the vehicle speed sensor 7. Then, the parking assist controller 10 does things such as making a display to guide the vehicle V to move from the cut-back position P3' to the parallel-parking completion position P4' by displaying information for turning the steering wheel in the opposite direction.

Thus, when the vehicle V is to be parallel-parked in the narrow available parking space 101, the parking assist system can guide the vehicle V along an optimal path until the vehicle V reaches the non-final target parking position 102' even though the parking assist system sets the non-final target parking position 102' by changing the angle of the target parking position 102 through the processing for setting the entering angle and the non-final target parking position 102'.

Note that, after the calculation of the path to the non-final target parking position 102', the parking assist controller 10 may guide the vehicle V by displaying the path on the display 3, providing audio guidance of the steering-wheel angles of the steering wheel and of the travelling directions, or controlling the steering-wheel angle of the steering wheel by means of the steering actuator 4.

[Processing for Calculating Path to Unchanged Target Parking Position 102]

Next, a description is given of processing for calculating a parking path for the vehicle V to travel from the non-final target parking position 102' to a point where the longitudinal direction of the vehicle V becomes parallel to the longitudinal direction of the available parking space 101, the processing being performed by the parking assist controller 10.

Figure 13:
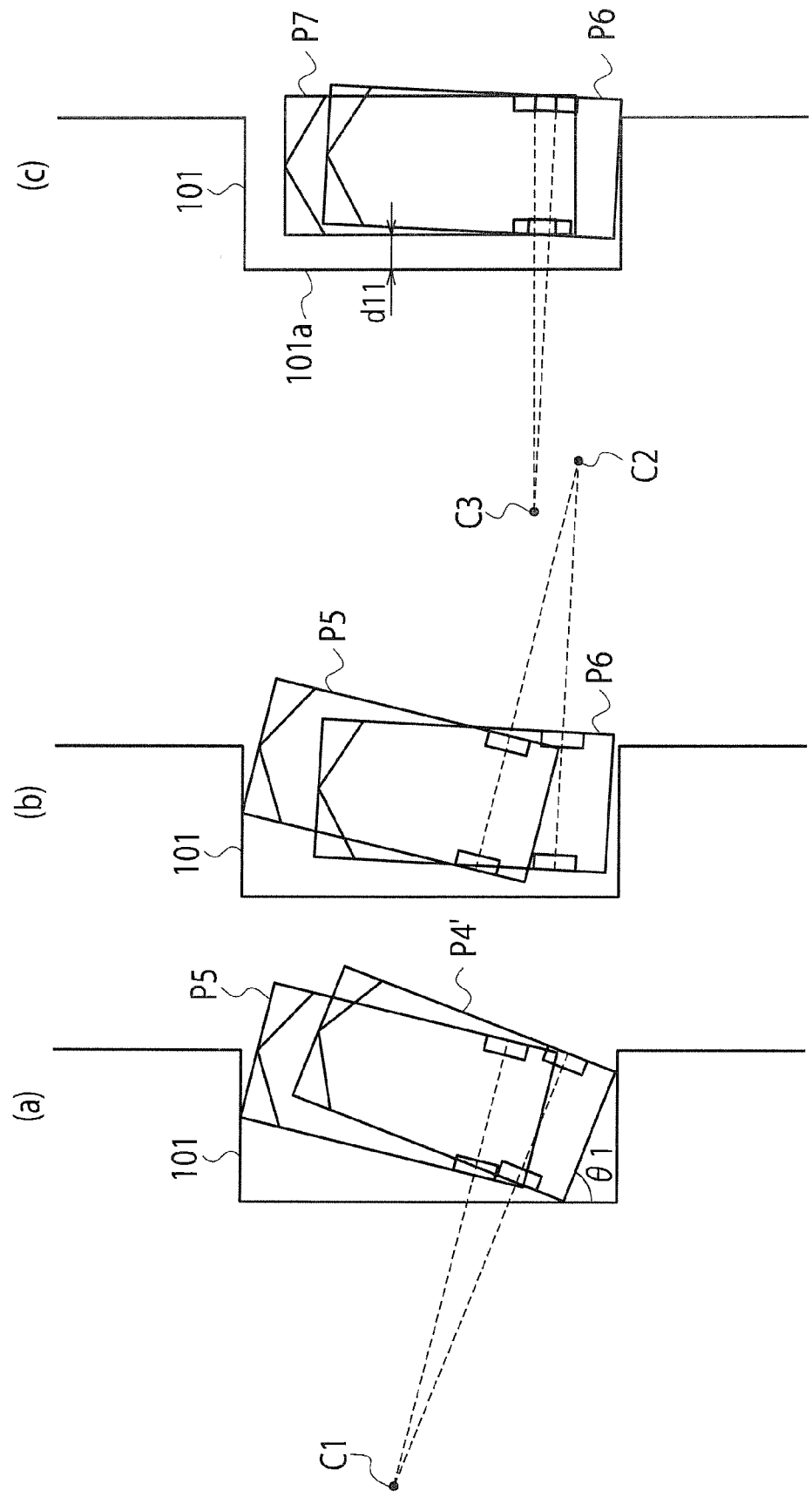
FIG. 13 is a top view showing how the parking assist system shown as the embodiment of the present invention makes the longitudinal direction of the vehicle become parallel to the longitudinal direction of the available parking space. Specifically.

FIG. 13 is a diagram showing first processing for guiding the vehicle V which is inclined at only the entering angle θ1 with respect to the available parking space 101, to a position where the orientation of the vehicle V is parallel to the available parking space 101.

After the vehicle V is stopped at the parallel-parking completion position P4', the parking assist controller 10 guides the vehicle V to move forward, with the steering wheel fixed at any certain steering-wheel angle, to a position P5 along a turn track about the turn center C1 as shown in FIG. 13(*a*). The position P5 is set to a position which allows the vehicle V not to come into contact with an obstacle at the front end point P of the available parking space 101. Thereafter, as shown in FIG. 13(*b*), the parking assist controller 10 guides the vehicle V to back up from the position P5 to a position P6 about the turn center C2. Then, as shown in FIG. 13(*c*), the parking assist controller 10 guides the vehicle V to move forward from the position P6 to a position P7 about a turn center C3.

In this way, the parking assist controller 10 guides the vehicle V to repeatedly move forward and back up until the vehicle V becomes parallel to the available parking space 101. In the case shown in FIG. 13, the longitudinal direction of the vehicle V becomes parallel to the longitudinal direction of the available parking space 101 by being moved forward from the position 6 about the turn center C3.

Note that, after the calculation of the path to the target parking position 102, the parking assist controller 10 may guide the vehicle V by displaying the path on the display 3, providing audio guidance of the steering-wheel angles of the steering wheel and of the travelling directions, or controlling the steering-wheel angle of the steering wheel by means of the steering actuator 4.

Figure 14:
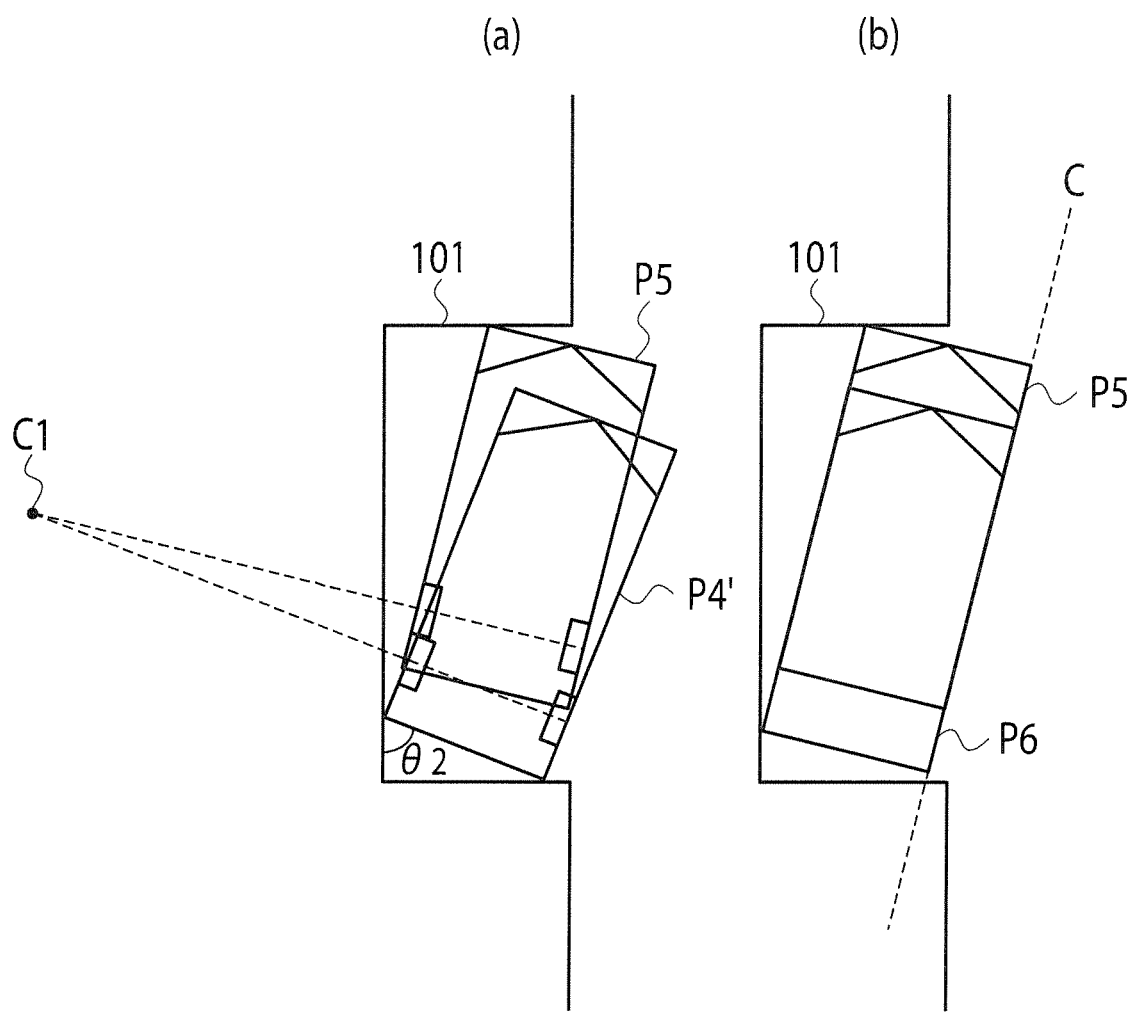
FIG. 14 is yet another top view showing how the parking assist system shown as the embodiment of the present invention makes the longitudinal direction of the vehicle become parallel to the longitudinal direction of the available parking space. Specifically.
Figure 15:
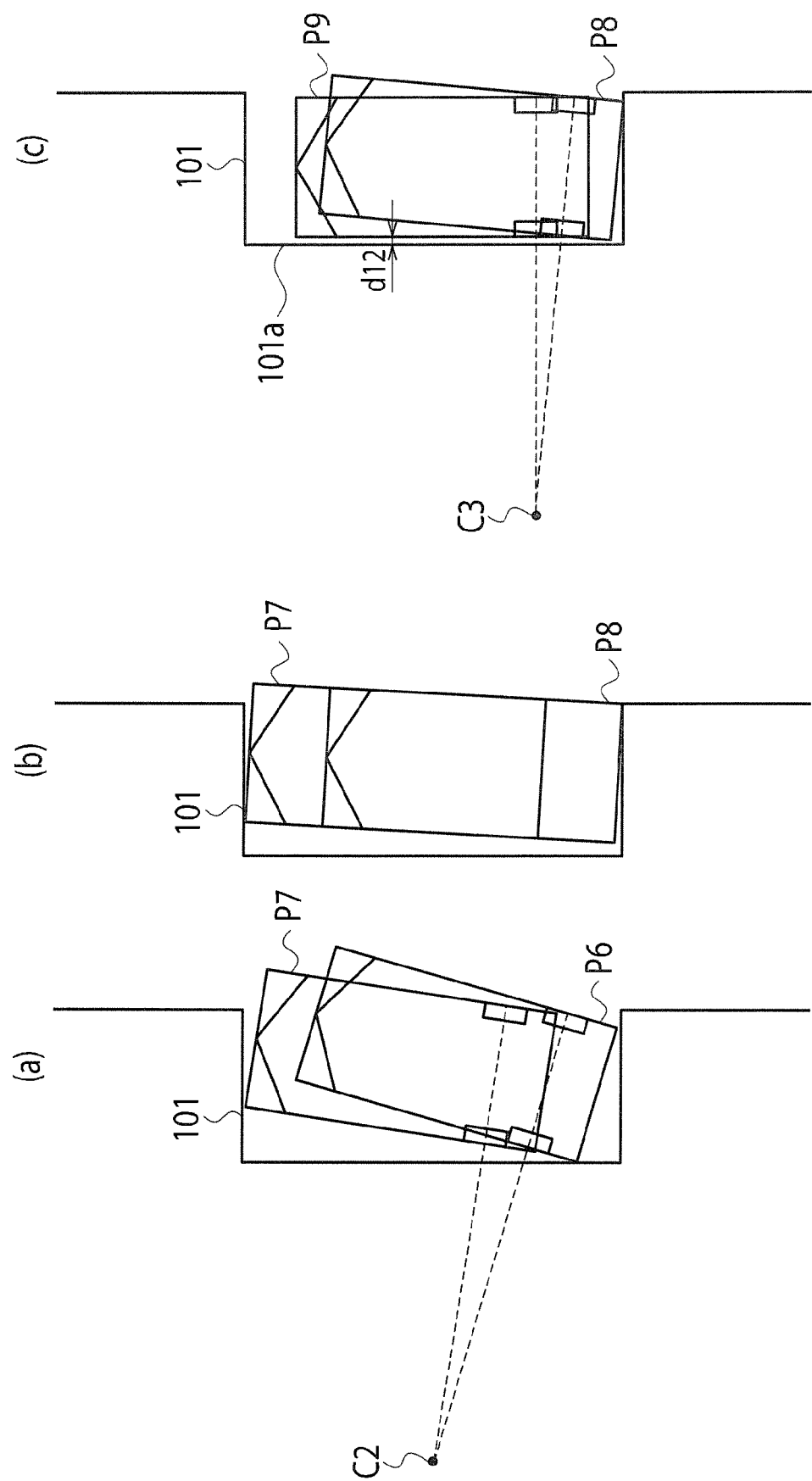
FIG. 15 is the other top view showing how the parking assist system shown as the embodiment of the present invention makes the longitudinal direction of the vehicle become parallel to the longitudinal direction of the available parking space. Specifically.

FIGS. 14 and 15 are diagrams showing second processing for guiding the vehicle V which is inclined at only the entering angle θ2 with respect to the available parking space 101, to a position where the orientation of the vehicle V is parallel to the available parking space 101.

After the vehicle V is stopped at the parallel-parking completion position P4', the parking assist controller 10 guides the vehicle V to move forward, with the steering wheel fixed at a certain steering-wheel angle, to a position P5 along a turn track about the turn center C1 as shown in FIG. 14(*a*). The position P5 is set to a position which allows the vehicle V not to come into contact with an obstacle at the front end point P of the available parking space 101. Thereafter, as shown in FIG. 14(*b*), the parking assist controller 10 guides the vehicle V to back up from the position P5 to a position P6 along a straight line C with the steering wheel in neutral. The vehicle V does not come into contact with the rear end potion of the available parking space 101 at the position P6.

Thereafter, as shown in FIG. 15(*a*), the vehicle V is guided to move forward to a position P7 where the vehicle V does not come into contact with the front end point P of the available parking space 101, by turning along a turn track about the turn center C1 with the steering wheel fixed at a certain steering-wheel angle. Then, as shown in FIG. 15(*b*), the vehicle V is guided to back up straight, with the steering wheel in neutral, to a position P8 where the vehicle V does not come into contact with the rear end portion of the available parking space 101. In this way, the parking assist controller 10 guides the vehicle V to repeatedly move forward to the positions where the vehicle V does not come into contact with the end portion of the available parking space 101 by turning along a turn track, and then back up straight to the positions where the vehicle V does not come into contact with the rear end portion of the available parking space 101.

Thereby, as shown in FIG. 15(*c*), finally, the parking assist controller 10 can guide the vehicle V to a position P9 where the longitudinal direction of the vehicle V is parallel to the longitudinal direction of the available parking space 101 by being moved forward from the position P8 while turning.

The number of cut-backs for making the longitudinal direction of the vehicle V parallel to the longitudinal direction of the available parking space 101 is larger in the second processing than in the first processing shown in FIG. 13. However, as to the distance between the vehicle V and an internal line 101a of the available parking space 101, a distance d11 shown in FIG. 13(*c*) can be made shorter than a distance d12 shown in FIG. 15(*c*).

As has been described in detail thus far, according to the parking assist system shown as the present embodiment, the target parking position 102 is set within the available parking space 101. Then, in the case where it is determined that the end portion of the vehicle V will come into contact with the end portion of the available parking space 101 if the vehicle V travels to be parked in the target parking position 102, the parking assist system calculates a parking path for the vehicle V to travel to the non-final target parking position 102' by changing the entering angle with respect to the available parking space 101 so that the vehicle V may travel toward the target parking position 102 while keeping the end portion of the vehicle V away from the end portion of the available parking space 101. According to this parking assist system, in the case where it is determined that the end portion of the vehicle V will come into contact with the end portion of the available parking space 101 if the vehicle V travels to be parked in the target parking position 102, the angle of the target parking position 102 with respect to the available parking space 101 is changed. For this reason, the parking assist can be performed even in a case where the end portion of the vehicle V is predicted to come into contact with an obstacle.

In addition, this parking assist system calculates multiple second paths including a path for the vehicle V to move to the non-final target parking position 102' by turning and a path for the vehicle V to move straight to the non-final target parking position 102'. Thereby, this parking assist system can display the two types of paths: one in which the vehicle V moves by turning and the other in which the vehicle V moves straight. Further, this parking assist system can allow the driver to select which path to use.

In addition, this parking assist system sets the entering angle 91 of the vehicle V with respect to the available parking space 101 so that the track of the end portion of the vehicle V moving forward from the non-final target parking position 102' with a predetermined turning radius can keep a certain distance from the end portion of the available parking space 101. Thereby, the vehicle V can be parked by backing up while keeping a certain distance from the end portion of the available parking space 101.

Moreover, according to this parking assist system, the entering angle θ2 of the vehicle V with respect to the available parking space 101 is set so that in possible tracks of the end portion of the vehicle V travelling straight from the non-final target parking position 102', the track of the end portion of the vehicle V on the side facing the inside of the available parking space 101 may keep a certain distance from the end portion of the available parking space 101. Thereby, the vehicle V can be parked by backing up while keeping a certain distance from the end portion of the available parking space 101.

Further, this parking assist system calculates a parking path for the vehicle V to travel from the non-final target parking position 102' until the longitudinal direction of the vehicle V becomes parallel to the longitudinal direction of the available parking space 101. Accordingly, even though the vehicle V is guided to the non-final target parking position 102', parking assist can be performed to guide the vehicle V from the non-final target parking position 102' until the vehicle V becomes parallel to the available parking space 101.

Furthermore, this parking assist system obtains the back-up start position P2 for the vehicle V to start backing up to the non-final target parking position 102' and the cut-back position P3' of cutting back the steering wheel to move the vehicle V toward the non-final target parking position 102' after the start of backing up from the back-up start position P2. Thereby, the vehicle V can be guided from the back-up start position P2 to the non-final target parking position 102'.

Further, this parking assist system calculates the parking path which makes the longitudinal direction of the vehicle V, which has been guided to the non-final target parking position 102', become parallel to the longitudinal direction of the available parking space 101 by repeatedly moving forward with the steering wheel fixed at a certain steering-wheel angle and backing up with the steering wheel fixed at a certain steering-wheel angle. Thereby, even though the vehicle V is guided to the non-final target parking position 102', the vehicle V can be parked in the unchanged target parking position 102.

Moreover, this parking assist system calculates the parking path which makes the longitudinal direction of the vehicle V, which has been guided to the non-final target parking position 102', become parallel to the longitudinal direction of the available parking space 101 by repeatedly moving forward with the steering wheel fixed at a certain steering-wheel angle and backing up with the steering-wheel angle in neutral. Thereby, even though the vehicle V is guided to the non-final target parking position 102', the vehicle V can be parked in the target parking position 102.

Note that the above-described embodiment is an example of the present invention. Therefore, naturally, the present invention is not limited to the embodiment above, and can be variously changed to modes other than the embodiment above according to a design or the like without departing from the technical concept of the present invention.

In the embodiment described above, the available parking space detection means for detecting an available parking space corresponds to the function of the parking assist controller 10 for setting the available parking space 101 and to the processing for setting the available parking space 101 in Step S1. The final target parking position setting means for setting a final target parking position corresponds to the function of the parking assist controller 10 for setting the target parking position 102 and to the processing for setting the target parking position 102 in Step S1. The contact determination means for determining whether or not there exists a first path for a vehicle V to reach the final target parking position 102 without coming into contact with an end portion of the available parking space 101 corresponds to the function of the parking assist controller 10 for determining whether or not an end portion of the vehicle V will come into contact with the front end point P and to the processing in Step S2. The non-final target parking position calculation means for, when the contact determination means determines that the first path does not exist, calculating an entering angle and a non-final target parking position 102', the entering angle enabling the vehicle V to enter the available parking space 101 without coming into contact with the end portion of the available parking space 101, the non-final target parking position 102' being a position to be reached when the vehicle V enters the available parking space 101 by using the entering angle, corresponds to the function of the parking assist controller 10 for setting the entering angles $\theta 1$, $\theta 2$ and the non-final target parking position 102' as well as to the processing in Step S5. The second-path calculation means for calculating a second path for the vehicle V to reach the non-final target parking position 102' calculated by the non-final target parking position calculation means corresponds to the function of the parking assist controller 10 for calculating a path from the initial position P1 to the parallel-parking completion position P4' and to the processing in Step S6. The third-path calculation means for calculating a third path for the vehicle V to reach the final target parking position 102 from the non-final target parking position 102' corresponds to the processing in which the parking assist controller 10 calculates a path from the non-final target parking position 102' to the final target parking position 102 as shown in FIGS. 13 to 16. The display means for displaying the first path when the contact determination means determines that the first path exists, and for displaying the second path and the third path when the contact determination means determines that the first path does not exists, corresponds to the processing in which the display 3 displays a path by being controlled by the parking assist controller 10 and to the processing in Step S4.

INDUSTRIAL APPLICABILITY

The present invention can be usable in the industry of parking assist apparatuses configured to present information for parking a vehicle to a driver.

REFERENCE SIGNS LIST

1*a* to 1*d* vehicle-mounted camera
2*a*, 2*b* ultrasonic sonar
3 display
4 steering actuator
5 operation input device
6 steering angle sensor
7 vehicle speed sensor
10 parking assist controller
101 available parking space
102 target parking position
102' non-target parking position
103 vehicle-end path
P1 initial position
P2 back-up start position
P3 cut-back position
P4 parallel-parking completion position

The invention claimed is:

1. A parking assist apparatus comprising:
an available parking space detector configured to detect an available parking space;
a final target parking position setter configured to set a final target parking position in the available parking space detected by the available parking space detector;
a contact determination device configured to determine whether or not there exists a first path for a vehicle to reach the final target parking position without coming into contact with an end portion of the available parking space;
a non-final target parking position calculator configured to calculate, when the contact determination device determines that the first path does not exist, a first entering angle, a second entering angle and a non-final target parking position, the first entering angle enabling the vehicle to enter the available parking space by moving straight without coming into contact with the end portion of the available parking space, the second entering angle being smaller than the first entering angle and enabling the vehicle to enter the available parking space by turning without coming into contact with the end portion of the available parking space, the non-final target parking position being a position to be reached when the vehicle enters the available parking space at the first entering angle or the second entering angle;

a second-path calculator configured to calculate a plurality of second paths, including a path for the vehicle to move to the non-final target parking position calculated by the non-final target parking position calculator by turning and a path for the vehicle to move straight to the non-final target parking position;

a third-path calculator configured to calculate a third path for the vehicle to reach the final target parking position from the non-final target parking position; and a display device configured to display the first path when the contact determination device determines that the first path exists, and to display the second paths and the third path when the contact determination device determines that the first path does not exist.

2. The parking assist apparatus according to claim 1, wherein
as the first entering angle, the non-final target parking position calculator is configured to calculate an entering angle which enables the vehicle to enter the available parking space by moving with a steering wheel at a substantially-neutral position, without coming into contact with the end portion of the available parking space, and
as a second path, the second-path calculator is configured to calculate a path for the vehicle to reach the non-final target parking position by moving with the steering wheel at the substantially-neutral position.

3. The parking assist apparatus according to claim 1, wherein
the non-final target parking position calculator is configured to set the first entering angle so that a track of an end portion of the vehicle moving forward from the non-final target parking position with a predetermined turning radius keeps a certain distance from the end portion of the available parking space.

4. The parking assist apparatus according to claim 1, wherein
the non-final target parking position calculator is configured to set the first entering angle so that a track of an end portion of the vehicle backing up straight from the non-final target parking position keeps a certain distance from the end portion of the available parking space.

5. The parking assist apparatus according to claim 1, wherein
the second-path calculator is configured to obtain:
a back-up start position for the vehicle to start backing up toward the non-final target parking position calculated by the non-final target parking position calculator; and
a cut-back position for, after the vehicle starts backing up from the back-up start position, cutting back a steering wheel in an opposite direction to move the vehicle toward the non-final target parking position.

6. The parking assist apparatus according to claim 1, wherein
the third-path calculator is configured to calculate the third path for the vehicle to repeatedly move forward with a steering wheel fixed at a certain steering-wheel angle and back up with the steering wheel fixed at a certain steering-wheel angle, so that a longitudinal direction of the vehicle becomes parallel to a longitudinal direction of the available parking space.

7. The parking assist apparatus according to claim 1, wherein
the third-path calculator is configured to calculate the third path for the vehicle to repeatedly move forward with a steering wheel fixed at a certain steering-wheel angle and back up with the steering wheel at a neutral steering-wheel angle, so that a longitudinal direction of the vehicle becomes parallel to a longitudinal direction of the available parking space.

8. A parking assist method, comprising:
detecting, by an available parking space detector, an available parking space, and setting, by a final target parking position setter, a final target parking position in the available parking space;
determining, by a contact determination device, whether or not there exists a first path for a vehicle to reach the final target parking position without coming into contact with an end portion of the available parking space;
when the first path exists, displaying the first path on a display device; and
when the first path does not exist, calculating, by a non-final target parking position calculator, a first entering angle, a second entering angle and a non-final target parking position, the first entering angle enabling the vehicle to enter the available parking space by moving straight without coming into contact with the end portion of the available parking space, the second entering angle being smaller than the first entering angle and enabling the vehicle to enter the available parking space by turning without coming into contact with the end portion of the available parking space, the non-final target parking position being a position to be reached when the vehicle enters the available parking space at the first or second entering angle, calculating, by a second-path calculator, a plurality of second paths, including a path for the vehicle to move to the non-final target parking position calculated by the non-final target parking position calculator by turning and a path for the vehicle to reach the non-final target parking position by moving straight, calculating, by a third-path calculator, a third path for the vehicle to reach the final target parking position from the non-final target parking position, and displaying the second paths and the third path on the display device.

9. The parking assist method according to claim 8, comprising:
as the first entering angle, calculating, by the non-final target parking position calculator, an entering angle which enables the vehicle to enter the available parking space by moving with a steering wheel at a substantially-neutral position, without coming into contact with the end portion of the available parking space, and
as the second path, calculating, by the second-path calculator, a path for the vehicle to reach the non-final target parking position by moving with the steering wheel at the substantially-neutral position.

10. A parking assist apparatus comprising:
available parking space detection means for detecting an available parking space;
final target parking position setting means for setting a final target parking position in the available parking space detected by the available parking space detection means;
contact determination means for determining whether or not there exists a first path for a vehicle to reach the final target parking position without coming into contact with an end portion of the available parking space;
non-final target parking position calculation means for, when the contact determination means determines that the first path does not exist, calculating a first entering angle, a second entering angle and a non-final target parking position, the first entering angle enabling the vehicle to enter the available parking space by moving straight without coming into contact with the end portion of the available parking space, the second entering angle being smaller than the first entering angle and enabling the vehicle to enter the available parking space by turning without coming into contact with the end portion of the available parking space, the non-final target parking position being a position to be reached when the vehicle enters the available parking space at the first entering angle or the second entering angle;
second-path calculation means for calculating a plurality of second paths, including a path for the vehicle to move to the non-final target parking position by turning and a path for the vehicle to move straight to the non-final target parking position;
third-path calculation means for calculating a third path for the vehicle to reach the final target parking position from the non-final target parking position; and
display means for displaying the first path when the contact determination means determines that the first path exists, and for displaying the second paths and the third path when the contact determination means determines that the first path does not exist.

* * * * *